(12) United States Patent
Chua-Eoan et al.

(10) Patent No.: US 7,812,582 B2
(45) Date of Patent: Oct. 12, 2010

(54) SYSTEM AND METHOD OF POWER DISTRIBUTION CONTROL OF AN INTEGRATED CIRCUIT

(75) Inventors: Lew G. Chua-Eoan, Carlsbad, CA (US); Boris Andreev, San Diego, CA (US); Christopher C. Riddle, San Diego, CA (US); Chunlei Shi, Poway, CA (US); Justin Joseph Rosen Gagne, San Diego, CA (US); Seong-Ook Jung, Goyang-Si (KR); Thomas R. Toms, Dripping Springs, TX (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 11/532,000

(22) Filed: Sep. 14, 2006

(65) Prior Publication Data
US 2008/0067995 A1    Mar. 20, 2008

(51) Int. Cl.
*G05F 1/40* (2006.01)
(52) U.S. Cl. .................................................... 323/282
(58) Field of Classification Search ............. 323/265, 323/271, 272, 282, 283, 351
See application file for complete search history.

(56) References Cited
U.S. PATENT DOCUMENTS

| 6,242,896 | B1 | 6/2001 | Nieberger |
| 6,337,580 | B2 | 1/2002 | Muramatsu |
| 6,404,172 | B1 | 6/2002 | May |
| 6,499,658 | B2 | 12/2002 | Goetz et al. |
| 6,879,142 | B2 | 4/2005 | Chen |
| 6,979,982 | B2 | 12/2005 | Herbert |
| 7,057,446 | B2 | 6/2006 | Choi et al. |
| 7,075,280 | B2 | 7/2006 | May |
| 7,088,002 | B2 | 8/2006 | Jensen |
| 7,098,632 | B2 | 8/2006 | Chen |
| 7,187,527 | B2 | 3/2007 | Su et al. |

(Continued)

FOREIGN PATENT DOCUMENTS

WO        05038920        4/2005

(Continued)

OTHER PUBLICATIONS

International Search Report-PCT/US07/067227, International Search Authority-European Patent Office-Oct. 1, 2007.

(Continued)

*Primary Examiner*—Adolf Berhane
(74) *Attorney, Agent, or Firm*—Sam Talpalatsky; Nicholas J. Pauley; Peter M. Kamarchik

(57) ABSTRACT

A device is disclosed that includes a first pin to supply power to a first power domain of an integrated circuit, a second pin to supply power to a second power domain of the integrated circuit, a switching regulator and a controller. The switching regulator is coupled to the first pin to provide a first regulated power supply to the first power domain and is coupled to the second pin to provide a second regulated power supply to the second power domain. The controller is coupled to the first pin and to the second pin to selectively reduce current flow to at least the second pin during a low power event.

43 Claims, 11 Drawing Sheets

U.S. PATENT DOCUMENTS

| | | |
|---|---|---|
| 7,372,161 B2 | 5/2008 | Lin et al. |
| 7,393,604 B2 | 7/2008 | Rocke et al. |
| 7,405,497 B2 | 7/2008 | Jacobs et al. |
| 2003/0025130 A1 * | 2/2003 | Takahashi et al. ........... 257/200 |
| 2006/0061383 A1 * | 3/2006 | Huang et al. .................. 326/62 |
| 2007/0002600 A1 | 1/2007 | May |
| 2007/0008011 A1 * | 1/2007 | Thurston ..................... 326/93 |

FOREIGN PATENT DOCUMENTS

| | | |
|---|---|---|
| WO | 06026627 | 3/2006 |

OTHER PUBLICATIONS

Mutoh S et al: "A 1 V Multi-threshold Voltage CMOS DSP With An Efficient Power Management Technique For Mobile Phone Application" Solid-State Circuits Conference, 1996. Digest Fo Technical Papers. 42nd ISSCCL, 1996 IEEE International San Francisco, CA, US Feb. 8-10, 1996, New York, NY, USA, IEEE, US, (Feb. 8, 1996), pp. 168-169, 438, XP01056440.

Written Opinion-PCT/US07/067227, International Search Authority-European Patent Office-Oct. 1, 2007.

* cited by examiner

SYSTEM AND METHOD OF POWER DISTRIBUTION CONTROL OF AN INTEGRATED CIRCUIT

RELATED APPLICATIONS

This application is related to Ser. No. 11/431,790, entitled "System and Method of Silicon Switched Power Delivery Using a Package", filed on May 10, 2006.

BACKGROUND

1. Field

The present disclosure generally relates to systems and methods of power distribution control.

2. Description of Related Art

Advances in technology have resulted in smaller and more powerful personal computing devices. For example, a variety of portable personal computing devices, including wireless computing devices, such as portable wireless telephones, personal digital assistants (PDAs), and paging devices are small, lightweight, and easily carried by users. More specifically, portable wireless telephones, such as cellular (analog and digital) telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

As the demand for new high performance features increases in portables systems, system level power management has become increasingly important in order to reduce power consumption and prolong battery life. Reducing power consumption of digital processes in portable electronic devices can improve the battery live and increase the available power budget for other features, such as color displays and backlighting, for example. To reduce power consumption, circuit designers have adopted various power management techniques.

A typical integrated circuit includes a substrate, which may include a plurality of embedded circuit structures, as well as one or more integrated circuit devices that are electrically coupled to the substrate. To reduce power consumption by such embedded circuit structures, one technique uses a plurality of power regulators to generate a plurality of power supplies, which may be utilized to satisfy power requirements of the various embedded circuit structures. Since at least one of the embedded circuit structures may use less power than others, a lower power supply may be provided to that structure, thereby conserving power in the overall power budget for other components. However, high voltage regulators consume a large amount of chip area.

Another technique to reduce power consumption involves switching power supplies to disable power to an embedded circuit structure when power is not needed. However, as semiconductor fabrication technologies achieve smaller and smaller devices, high voltage switches may be difficult to scale. Moreover, such switches contribute to layout and routing complexity.

Accordingly, it would be advantageous to provide an improved power distribution system and method that reduces power loss.

SUMMARY

In a particular embodiment, a device is disclosed that includes a first pin to supply power to a first power domain of an integrated circuit, a second pin to supply power to a second power domain of the integrated circuit, a switching regulator, and a controller. The switching regulator is coupled to the first pin to provide a first regulated power supply to the first power domain and is coupled to the second pin to provide a second regulated power supply to the second power domain. The controller is coupled to the first pin and to the second pin to selectively reduce current flow during a low power event. In a particular embodiment, the controller is adapted to limit the current flow to a current level less than approximately 100 nanoamperes in response to the low power event.

In another particular embodiment, a power manager integrated circuit includes a buck controller to produce a first regulated power supply, a first pin, a second pin, and a head controller. The first pin is coupled to a first power domain of the integrated circuit and is responsive to the buck controller to provide the first regulated power supply to the first power domain. The second pin is coupled to a second power domain of the integrated circuit to provide a second regulated power supply derived from the first regulated power supply to the second power domain. The head controller is adapted to determine an operating mode and to selectively substantially reduce current flow to the second pin when the operating mode comprises a low power mode.

In still another particular embodiment, a method is provided that includes supplying a first regulated supply voltage to a first pin of a power manager integrated circuit and a second regulated supply voltage to a second pin of the power manager integrated circuit. The method further includes selectively disabling or substantially reducing current flow to the second pin in a particular operating mode. The power manager integrated circuit is coupled to an integrated circuit device including a first power domain responsive to the first pin and a second power domain responsive to the second pin. In a particular embodiment, selectively disabling current flow includes deactivating a transistor to disable or reduce current flow to the second pin when the integrated circuit device is in a low power mode of operation.

One particular advantage provided by embodiments of the power manager integrated circuit is that semiconductor manufacturing processes may be utilized in conjunction with a viable, high voltage transistor device to limit current leakage. In one particular embodiment, the power manager integrated circuit may be fabricated using an older, lower cost semiconductor manufacturing technology and may be utilized to supply power to a circuit device produced with newer and/or more expensive semiconductor manufacturing technologies.

Another particular advantage is provided by embodiments of the power manager integrated circuit in that the power manager integrated circuit substantially reduces a leakage current of an electronic device to a current level of less than approximately 100 nanoamperes, when a head switch is disabled.

Yet another particular advantage is that a single regulator may be utilized within a power manager integrated circuit to provide a regulated power supply to a plurality of power domains of an integrated circuit device. One particular advantage of the single regulator is that costs of the power manager integrated circuit are reduced. Moreover, the single regulator of the power manager integrated circuit allows the state of the electronic device to be retained via a single power domain.

Still another advantage of a particular embodiment of a power manager integrated circuit coupled to an integrated circuit device is that leakage gating resources are not needed in the integrated circuit device to prevent current leakage. By eliminating the need for such gating resources, it may be possible to reduce the area and complexity of power routing of the integrated circuit device during an integrated circuit design process.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1A:
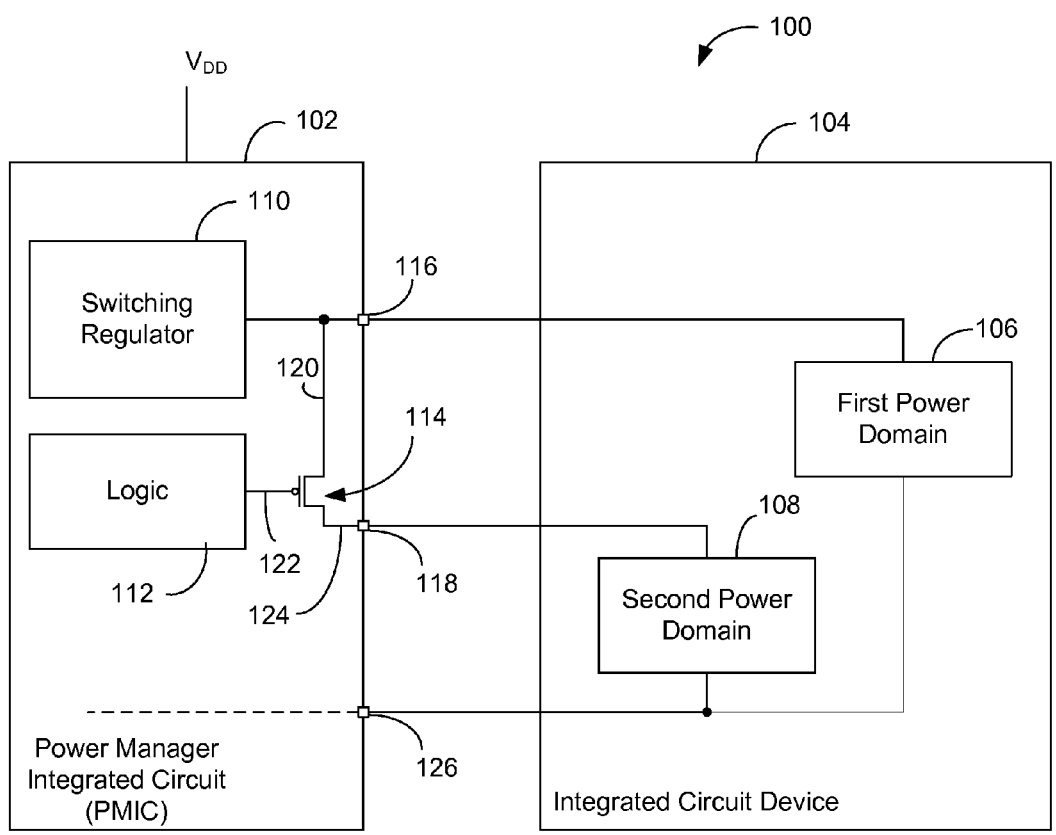
FIG. 1A is a diagram of an illustrative embodiment of an electronic device including a particular embodiment of a power manager integrated circuit in a head switch configuration.

FIG. 1A is a block diagram of an illustrative embodiment of an electronic device 100 including a particular embodiment of a power manager integrated circuit (PMIC) 102 and an integrated circuit device 104. The integrated circuit device 104 may include multiple power domains, such as a first power domain 106 and a second power domain 108. The power manager integrated circuit 102 may include a switching regulator 110, logic 112, a transistor (switch) 114, a first pin 116 and a second pin 118. The switching regulator 110 is coupled to the first pin 116 and is coupled to the second pin 118 via the switch 114. The switch 114 may be a metal oxide semiconductor field effect transistor (MOSFET), a field effect transistor (FET), a bipolar junction transistor, or another circuit device that may be controlled by logic 112 to selectively enable and disable current flow to the second pin 118. In general, the switch 114 may be an n-channel MOSFET or a p-channel MOSFET device in the PMIC technology. If the switch 114 is an n-channel MOSFET device, then the switching regulator 110 may be at a larger voltage potential than the integrated circuit device 104.

The switch 114 includes a first terminal 120 coupled to the first pin 116, a control terminal 122 coupled to the logic 112, and a second terminal 124 coupled to the second pin 118. The first pin 116 may be coupled to the first power domain 106 of the integrated circuit device 104, and the second pin 118 may be coupled to the second power domain 108 of the integrated circuit device 104. A third pin 126 may provide a ground connection to the PMIC 102 for the first power domain and the second power domain.

In a normal operating mode, the switching regulator 110 provides a regulated power supply to the first pin 116. The logic 112 may activate the switch 114 via the control terminal 122 to provide at least a portion of the regulated power supply to the second pin 118. During a shut off event or a low power event, or during other power saving modes of operation, the logic 112 may selectively deactivate the switch 114 to substantially reduce current flow to the second pin 118. By reducing current flow to the second pin 118, the logic 112 substantially reduces current flow to the second power domain 108 of the integrated circuit device 104. In a particular embodiment, the switching regulator 110 may continue to deliver power to the first pin 116 and to the first power domain 106 after current flow to the second pin 118 is reduced. Thus, the switching regulator 110 may be utilized to selectively provide power to the second power domain 108 of the integrated circuit device 104.

In general, it should be understood that random access memory (RAM), such as synchronous dynamic random access memory (SDRAM) and other memory components account for a significant amount of static power consumption. For example, a 256 Mbit SDRAM (such as that produced by Elpida Memory, Inc. of Japan) may consume as much as 275 microamperes at 1.8 volts during normal operations or approximately $1.844 \times 10^{-9}$ milliwatts per bit. An SDRAM that consumes 1.02 pA per bit at 1.8 volts consumes approximately 1.84 picowatts per bit. By utilizing the PMIC 102 to selectively turn off power to the second power domain 108 of the integrated circuit device 104, which may include an SDRAM device, power consumption for the circuit device 100 may be reduced. By utilizing a single switching regulator, such as the switching regulator 110, to produce the regulated power supply, it is possible to deliver a consistent power supply to one power domain, such as the first power domain 106, allowing state information to be retained in a memory location within the first power domain 106, while significantly reducing power to other power domains of the integrated circuit device 104, such as the second power domain 108.

Figure 1B:
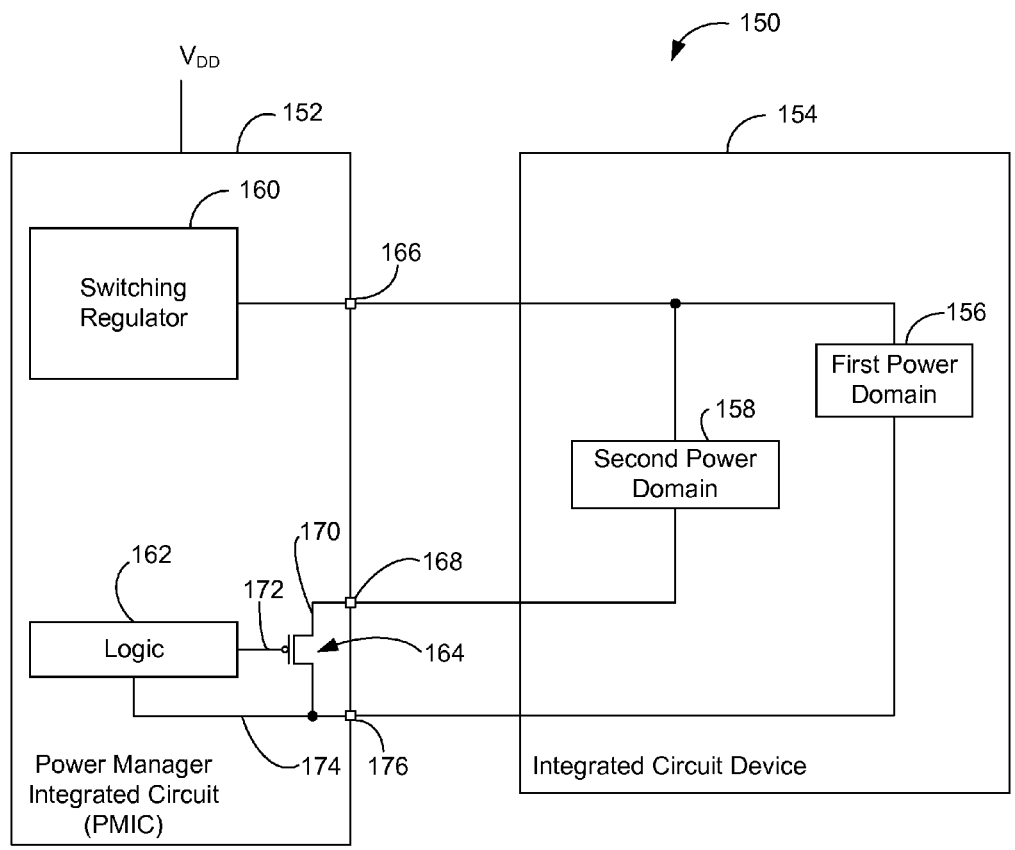
FIG. 1B is a diagram of an alternative embodiment of an electronic device including a particular embodiment of a power manager integrated circuit in a foot switch configuration.

FIG. 1B is a block diagram of an alternative illustrative embodiment of an electronic device 150 including a particular embodiment of a power manager integrated circuit (PMIC) 152 and an integrated circuit device 154. The electronic device 150 includes a PMIC 152 arranged in foot-switch configuration. In particular, the integrated circuit device 154 may include multiple power domains, such as the first power domain 156 and the second power domain 158. The power manager integrated circuit 152 may include a switching regulator 160, logic 162, a transistor (switch) 164, a first pin 166, a second pin 168, and a third pin 176. The switching regulator 160 is coupled to the first power domain 156 and the second power domain 158 via the first pin 166. The switch 164 includes a first terminal 170 that is coupled to the second power domain 158 via the second pin 168. The switch 164 also includes a control terminal 172 that is coupled to the logic 162 and a second terminal 174 coupled to the logic 162 and to the third pin 176. The first power domain 156 may be coupled to the logic 162 via the third pin 176. In operation, the PMIC 152 may selectively disable the second power domain 158 by deactivating the switch 164 to reduce current flow, while providing power to the first power domain 156 via the switching regulator 160.

In general, it should be understood that the PMIC 102 and the PMIC 152 of FIGS. 1A and 1B may include more than one switch 114 and that the integrated circuit device 104 may include a plurality of power domains. In a particular embodiment, the switches may be selectively deactivated to disable power to selected power domains of a plurality of power domains of the integrated circuit device 104.

Figure 2:
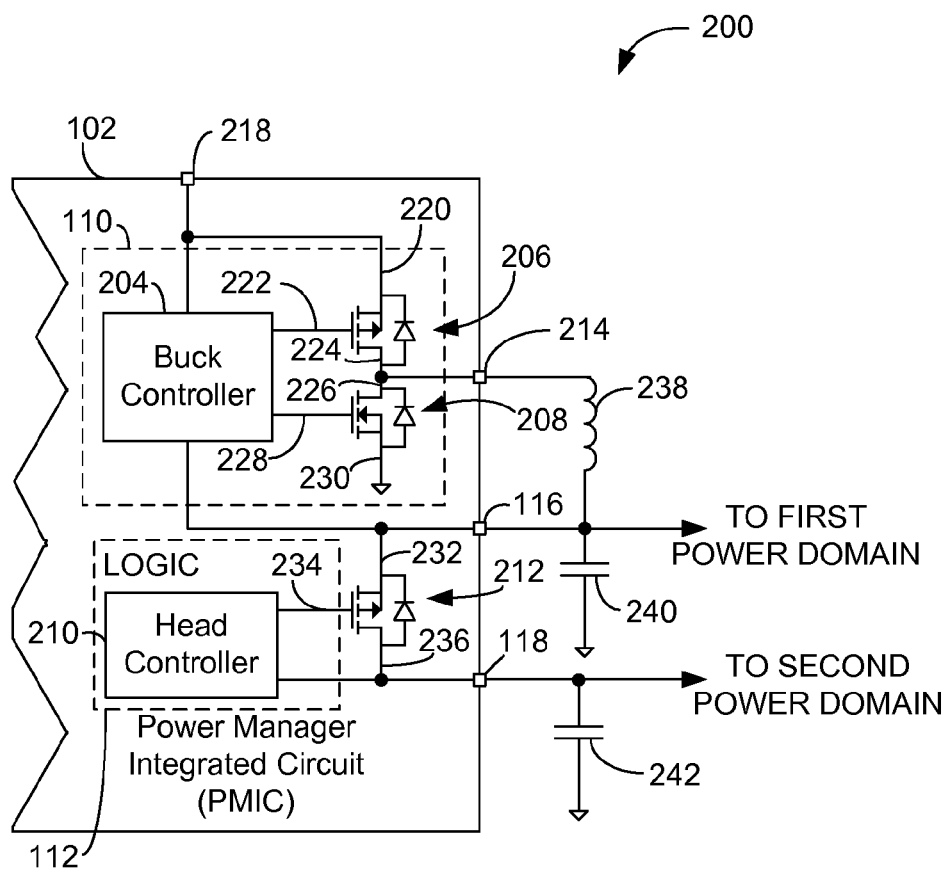
FIG. 2 is a diagram of an illustrative portion of a particular embodiment of a power manager integrated circuit.

FIG. 2 is a diagram of an illustrative portion 200 of a particular embodiment of a power manager integrated circuit (PMIC) 102. The PMIC 102 includes a switching regulator, such as the switching regulator 110 and logic 112. The switching regulator 110 may include a buck controller 204, a first transistor 206, and a second transistor 208. The logic 112 may include a head controller 210. The PMIC 102 may also include a third transistor 212, a first pin 116, a second pin 118, a third pin 214 and a fourth pin 218. The fourth pin 218 may be coupled to a power supply terminal, such as $V_{DD}$ in FIG. 1A.

In general, the first transistor 206 includes a first terminal 220 coupled to the fourth pin 218, a control terminal 222 coupled to the buck controller 204, and a second terminal 224 coupled to the third pin 214. The second transistor 208 includes a first terminal 226 coupled to the third pin 214, a control terminal 228 coupled to the buck controller 204, and a second terminal 230 coupled to a voltage supply terminal, which may be an electrical ground. The third transistor 212 includes a first terminal 232 coupled to the first pin 116, a control terminal 234 coupled to the head controller 210, and a second terminal 236 coupled to the second pin 118.

An external inductor 238 may be coupled between the third pin 214 and the first pin 116. A capacitor 240 may be coupled between the first pin 116 and a voltage supply terminal, which may be an electrical ground, to filter the power supply to the first power domain. A capacitor 242 may be coupled between the second pin 118 and a voltage supply terminal, which may be an electrical ground, to filter the power supply to the second power domain.

In a particular embodiment, the switching regulator 110 is coupled to the first pin 116 to provide a first regulated power supply to the first power domain and is coupled to the second pin 118 to provide a second regulated power supply to the second power domain via the third transistor 212. The head controller 210 is coupled to the control terminal 234 of the third transistor 212 and to the second pin 118 to selectively deactivate the third transistor 212, such as during a low power event. The third transistor 212 may be a high voltage transistor and may operate as a switch to selectively deactivate a second regulated power supply to the second power domain.

In operation, the head controller 210 may selectively activate the third transistor 212 to provide current flow to the second pin 118 during a normal operating mode. The head controller 210 may selectively deactivate the third transistor 212 to substantially reduce or shut off current flow to the second pin 118 during a low power event, such as a shut down event, an idle event, a reduced power event, or any combination thereof. In one particular embodiment, the head controller 210 may operate to substantially reduce leakage current via the third transistor 212, for example, to a current level less than approximately 100 nanoamperes.

In general, the third transistor 212 cooperates with the head controller 210 to use the regulated voltage supply provided by the buck regulator (e.g. the buck controller 204, the first transistor 206 and the second transistor 208) to provide a switched power supply to the second pin 118 without using extra components, such as extra voltage regulators. The first pin 116 receives a regulated output from the buck regulator 204, and the second pin 116 receives an unregulated output generated from the regulated output via the third transistor (head switch) 212. In a particular embodiment, the third transistor 212 can be designed to provide a voltage drop of approximately 5 mV when a 100 mA load is coupled to the second pin 118.

In general, a circuit design process typically includes establishing and maintaining correct circuit behavior under a variety of operating conditions, including variations in process, voltage, and temperature (PVT). Therefore, behavioral modeling of analog circuits typically includes extending the integrated circuit model to accurately represent the behavior of the integrated circuit at possible PVT values. To meet a 5 mV DC loss specification, for example, the third transistor 212 should be designed to have an on-resistance that is small enough to maintain consistent performance at the PVT values. For example, the total loss resistance (R_loss) of the PMIC 102 may be written as a sum of the on-resistance (R_on), the routing resistance (R_routing), and the package resistance (R_package) as follows:

$$R\_loss = R\_on + R\_routing + R\_package \quad \text{(Equation 1)}$$

If a maximum R_loss is approximately 50 mohms and if R_package and R_routing are approximately 10 mohms and 20 mohms, respectively, the maximum on-resistance (R_on) should be less than approximately 20 mohms across all PVT corners. In a particular embodiment, the on-resistance is less than approximately 7 mohms.

In a particular embodiment, the output voltage specification specifies a medium voltage n-channel field effect transistor (NFET) for the third transistor 212. The on-resistance data of a medium voltage NFET in a Chartered 0.18 μm high voltage complementary metal oxide semiconductor (CMOS) process may be estimated according to the following equation:

$$R\_on = 3.5 \text{ mohm} * mm^2 \quad \text{(Equation 2)}$$

If the on-resistance is approximately 7 mohms, the layout area of the third transistor may be estimated to be 0.5 mm². In a particular embodiment, the estimated wafer price of approximately 2.4 cents per square millimeter indicates that the silicon cost is 1.2 cents for the third switch 212.

In one particular embodiment, the PMIC 102 and an associated integrated circuit that includes multiple power domains (such as the integrated circuit device 104 of FIG. 1A) may be manufactured using different semiconductor manufacturing technologies. For example, the PMIC 102 may be fabricated using a 0.18 μm high voltage CMOS process, while the integrated circuit device 104 may be manufactured using a 45 nm process. In another particular embodiment, the PMIC 102 may be fabricated using a 100 nm technology and the integrated circuit device may be fabricated using a 45 nm technology (e.g. the PMIC 102 may be fabricated using an older fabrication technology, while the integrated circuit device, such as the integrated circuit device 104 of FIG. 1A, may be fabricated using a newer fabrication technology).

Figure 3:
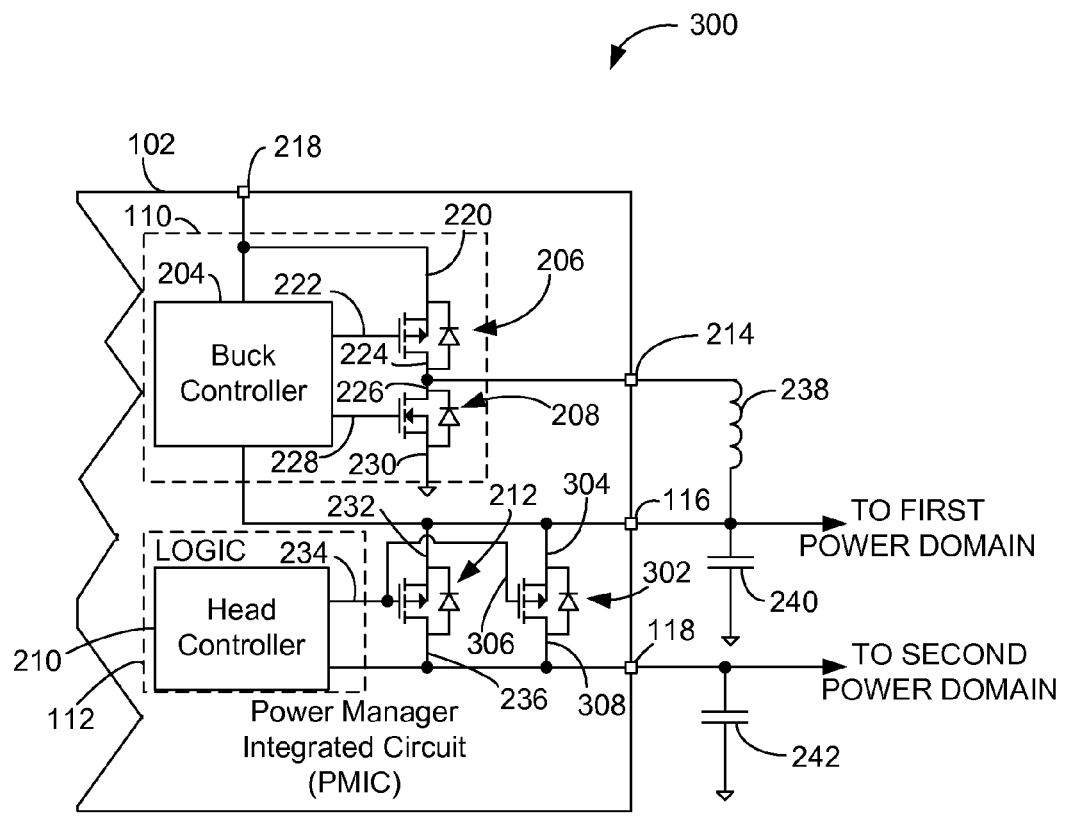
FIG. 3 is a diagram of an illustrative portion of a particular alternative embodiment of the power manager integrated circuit of FIG. 2.

FIG. 3 is a diagram of a portion 300 of a particular illustrative embodiment of the power manager integrated circuit (PMIC) 102 of FIG. 2. The PMIC 102 may include the switching regulator 110, the logic 112, and other elements of the portion 200 of FIG. 2, as well as a fourth transistor 302 arranged in parallel with the third transistor 212. The fourth transistor 302 may include a first terminal 304 coupled to the first pin 116, a control terminal 306 coupled to the control terminal 234 of the third transistor 212, and a second terminal 306 coupled to the second pin 118.

In operation, the fourth transistor 302 may reduce a voltage drop across the third transistor 212 during normal operation, in part, by dividing current flow between the third transistor 212 and the fourth transistor 214. Moreover, by activating the third transistor 212 and the fourth transistor 302, more current may flow to the second pin 118 than would otherwise be possible without exceeding a current rating of the third transistor 212. During a low-power or shut down event, the head controller 210 may deactivate the third transistor 212 and the fourth transistor 302 to turn off current flow to the second pin 118, and to reduce leakage. In a particular embodiment, the leakage current may be reduced to a level that is less than approximately 100 nanoamperes.

Figure 4:
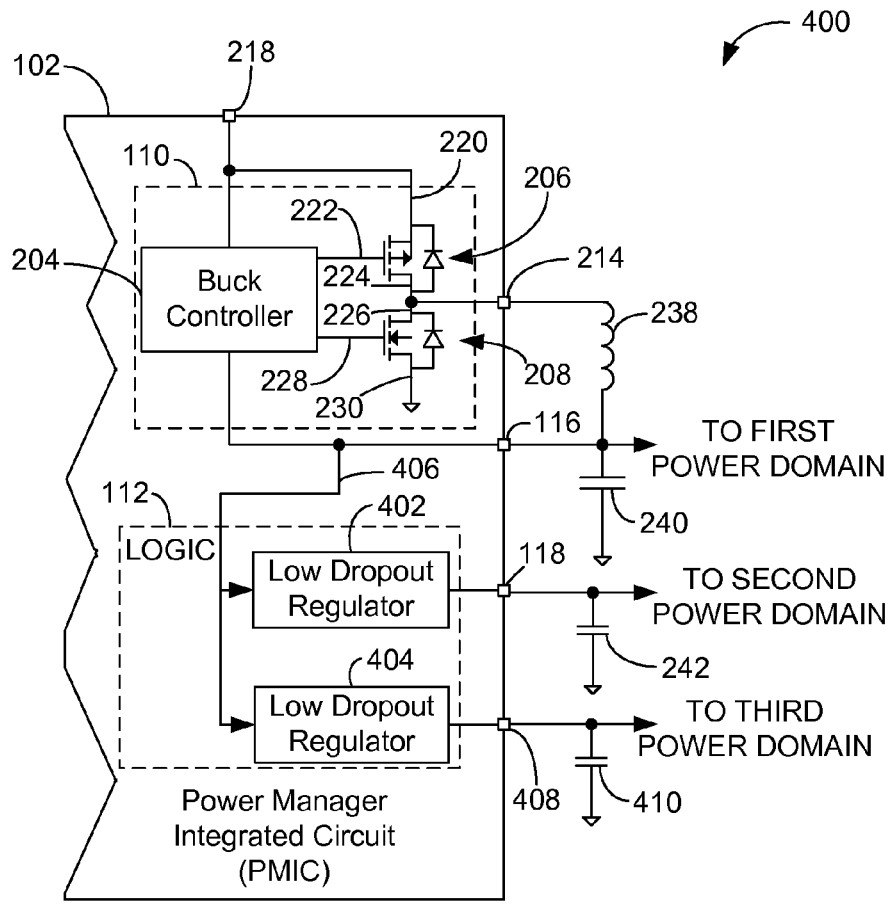
FIG. 4 is a diagram of an illustrative portion of another particular illustrative embodiment of a power manager integrated circuit.

FIG. 4 is an illustrative diagram of a particular illustrative embodiment of a portion 400 of another particular embodiment of a power manager integrated circuit (PMIC) 102. The PMIC 102 includes the switching regulator 110 and the logic 112. In this particular illustrative embodiment, the logic 112 includes a first low dropout regulator 402 and a second low dropout regulator 404. As used herein, a low dropout regulator may include a voltage regulator that provides a regulated voltage supply with a low voltage drop (e.g. low power consumption). The line 406 couples the low dropout regulators 402 and 404 to the first pin 116. The first low dropout regulator 402 is coupled to the second pin 118 to provide a second regulated power supply derived from the first regulated power supply provided to the first pin 116 by the switching regulator 110, and the second low dropout regulator 404 is coupled to a fifth pin 408. In this embodiment, the first pin 116 may be coupled to a first power domain of a circuit device (such as the integrated circuit device 104 of FIG. 1A) to provide a first regulated power supply to the first power domain. The second pin 118 may be coupled to a second power domain of the circuit device to provide a second regulated power supply to the second power domain. The fifth pin 408 may be coupled to a third power domain of a circuit device to provide a third regulated power supply to the third power domain. The logic 112 may include multiple low dropout regulators and may be adapted to selectively control each of the low dropout regulators to activate and deactivate a regulated power supply to an associated power domain of the integrated circuit. A capacitor 410 may be coupled between the fifth pin 408 and a voltage supply terminal, which may be an electrical ground, to filter the power supply to the third power domain.

In this approach, the switching regulator 110 provides the first regulated power supply to the first pin 116 and the low dropout regulators 402 and 404 generate second and third regulated power supplies, respectively, based on the first regulated power supply. The low dropout regulators 402 and 404 can be designed to provide power supplies that are approximately matched supplies (such as within 5 mV of each other). In a particular embodiment, the first low dropout (LDO) regulator 402 may be approximately a 300 mA LDO regulator and the second LDO regulator 404 may be approximately a 150 mA LDO regulator. The layout area of the first LDO regulator 402 and the second LDO regulator 404 may be estimated to be approximately 0.17 mm$^2$ and 0.11 mm$^2$, respectively. The total silicon cost of the two LDO regulators 402 and 404 may be approximately 0.67 cents.

In a particular embodiment, the switching regulator 110 may be a high voltage power regulator. The LDO regulators 402 and 404 may be lower voltage regulators, which are adapted to derive power from the switching regulator 110. Thus, the LDO regulators 402 and 404 may be produced using less silicon area than the switching regulator 110.

Figure 5:
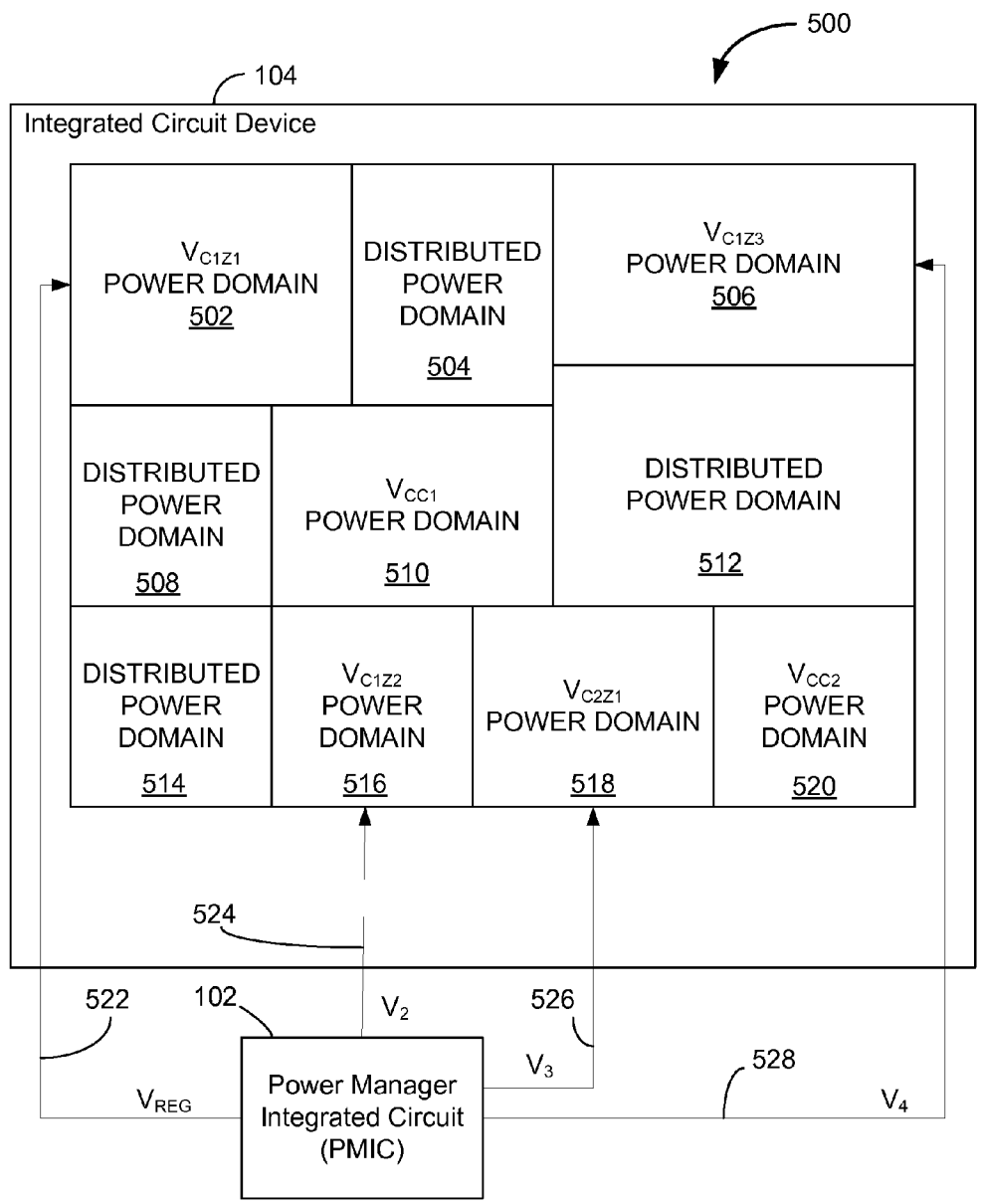
FIG. 5 is a block diagram of a particular illustrative embodiment of an integrated circuit device having a plurality of power domains and including a power manager integrated circuit according to FIGS. 1-4.

FIG. 5 is a block diagram of a system 500 including an integrated circuit device 104 having a plurality of power domains and including a power manager integrated circuit 102 according to FIGS. 1-4. The integrated circuit device 104 may include a plurality of power domains, including a $V_{C1Z1}$ power domain 502, a distributed power domain 504, a $V_{C1Z3}$ power domain 506, a distributed power domain 508, a $V_{CC1}$ power domain 510, distributed power domains 512 and 514, a $V_{C1Z2}$ power domain 516, a $V_{C2Z1}$ power domain 518, and a $V_{CC2}$ power domain 520. The power manager integrated circuit (PMIC) 102 may be adapted to provide one or more regulated power supplies to one or more of the power domains, using a single switching regulator, as shown in FIGS. 1-4. The PMIC 102 may provide a first regulated power supply $V_{REG}$, for example, to the $V_{C1Z1}$ power domain 502 via line 522. The PMIC 102 may also provide a second power supply ($V_2$) to the $V_{C1Z2}$ power domain 516 via line 524, a third power supply ($V_3$) to the $V_{C2Z1}$ power domain 518 via line 526, and a fourth power supply ($V_4$) to the $V_{C1Z3}$ power domain 506 via line 528. The second, third and fourth power supplies ($V_2$, $V_3$, and $V_4$) may be unregulated if the PMIC 102 includes the particular arrangement of FIGS. 1-3 or may be regulated if the PMIC 102 includes the particular arrangement of FIG. 4.

Figure 6:
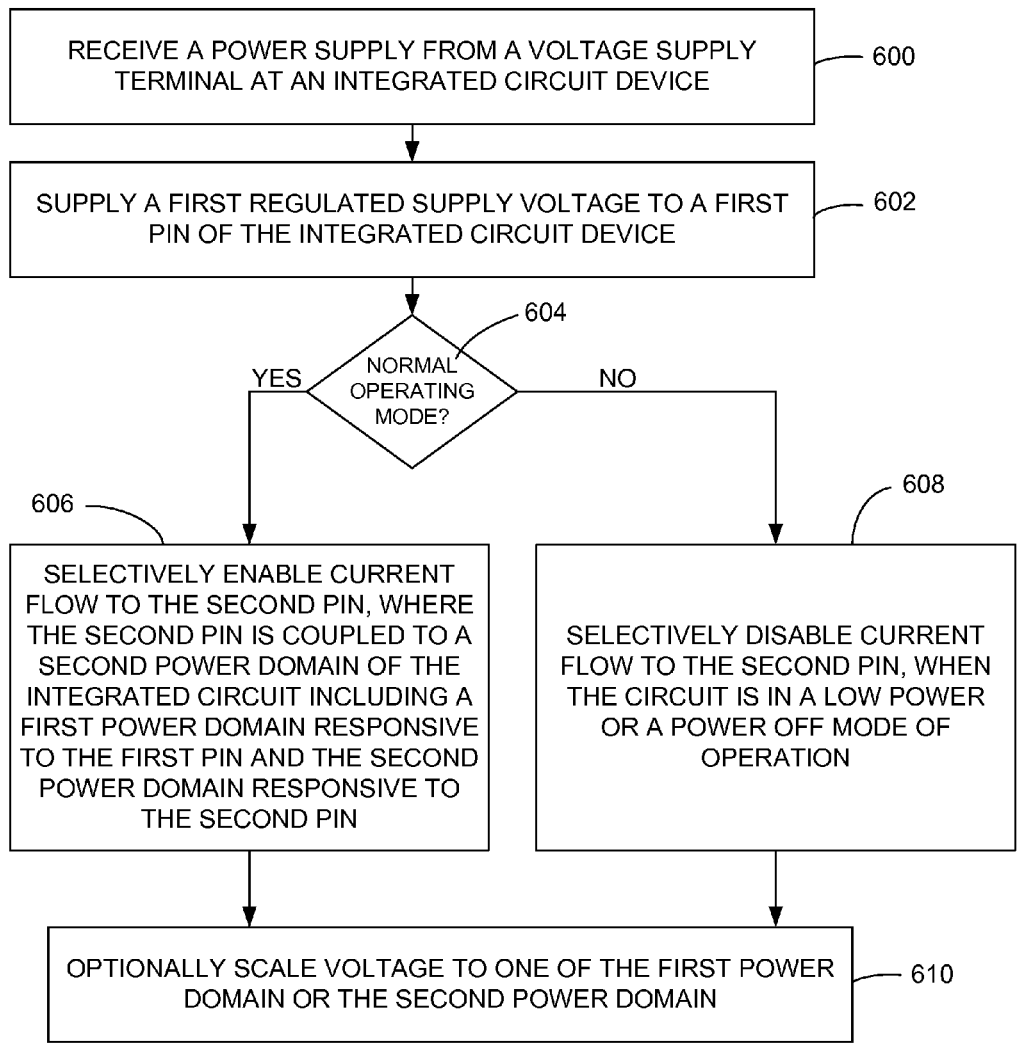
FIG. 6 is a flow diagram of a particular illustrative embodiment of a method of selectively disabling current flow to at least one pin of a power manager integrated circuit.

FIG. 6 is a flow diagram of a method of selectively disabling or substantially reducing current flow to at least one pin of a power manager integrated circuit of a system. A power supply may be received from a voltage supply terminal at a power manager integrated circuit (block 600). A first regulated supply voltage is supplied to a first pin of the power manager integrated circuit (block 602). When the system is in a normal operating mode (block 604), a current flow is selectively enabled to the second pin, where the second pin is coupled to a second power domain of the integrated circuit device including a first power domain responsive to the first pin and the second power domain responsive to the second pin (block 606). In general, the current flow may be selectively enabled by activating a transistor (such as the third transistor 212 of FIGS. 2 and 3) to enable current flow to the second pin. When the system is not in a normal operating mode, the current flow may be selectively disabled to the second pin, for example, when the system is in a low power or a power off mode of operation (block 608). The voltage level may optionally be scaled to one of the first power domain or the second power domain (block 610). In a particular embodiment, logic of the PMIC (such as logic 112 in FIG. 1A) may operate to scale a voltage level to one or more power domains of the integrated circuit device, to scale or adjust a power supply to a collapsible power domain, for example.

In a particular embodiment, the current flow may be selectively disabled by deactivating one or more transistors (e.g.

the third transistor 212 and the fourth transistor 302 of FIG. 3) to substantially reduce current flow to the second pin (such as the second pin 118 of FIGS. 1-4). In a particular embodiment, the current flow to the second pin may be reduced to a current level that is less than approximately 100 nanoamperes, thereby reducing power to the second power domain.

In a particular embodiment, the method may include providing the regulated power supply to the first pin to provide power to the first power domain, which may include a memory, during the low power mode to retain a state of the integrated circuit device. In a particular embodiment, the first regulated power supply and the second regulated power supply may be at different power levels. For example, the power manager integrated circuit may provide a different regulated power supply to each domain of a plurality of power domains of the integrated circuit, and each of the power supplies may be selectively deactivated.

Figure 7:
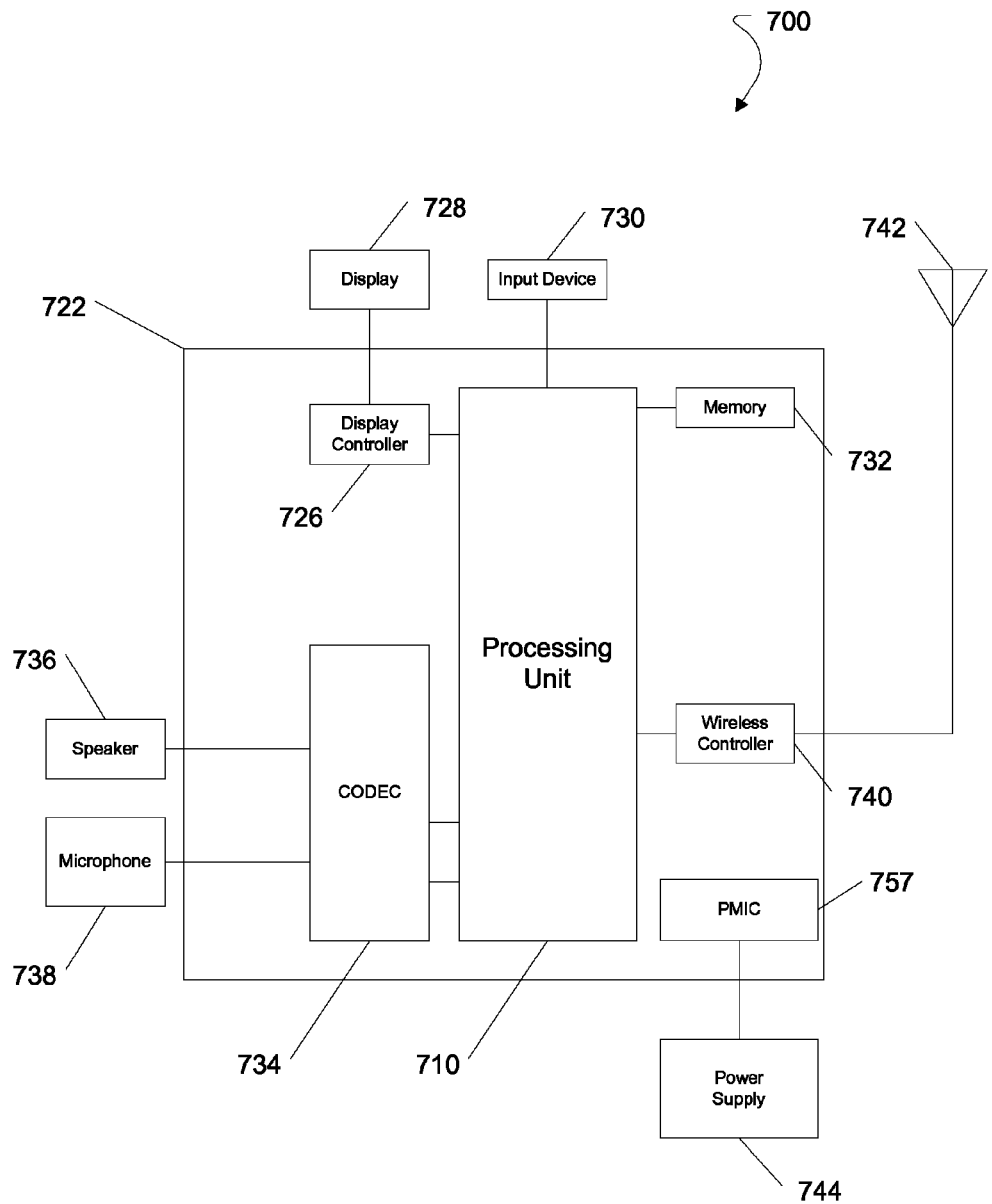
FIG. 7 is a general diagram of an exemplary cellular telephone incorporating a processor and a memory in which the system and method of FIGS. 1-6 may be used.

FIG. 7 illustrates an exemplary, non-limiting embodiment of a portable communication device that is generally designated 700. As illustrated in FIG. 7, the portable communication device includes an on-chip system 722 that includes a processing unit 710, which may be a general purpose processor, a digital signal processor, an advanced reduced instruction set machine processor, or any combination thereof FIG. 7 also shows a display controller 726 that is coupled to the processing unit 710 and a display 728. Moreover, an input device 730 is coupled to the processing unit 710. As shown, a memory 732 is coupled to the processing unit 710. Additionally, a coder/decoder (CODEC) 734 can be coupled to the processing unit 710. A speaker 736 and a microphone 738 can be coupled to the CODEC 730. In a particular embodiment, the processing unit 710, the display controller 726, the memory 732, the CODEC 734, other components, or any combination thereof may receive power via one or more pins of a power manager integrated circuit (PMIC) 757, as shown in FIGS. 1-6 and described herein.

FIG. 7 also indicates that a wireless controller 740 can be coupled to the processing unit 710 and a wireless antenna 742. In a particular embodiment, a power supply 744 is coupled to the on-chip system 722. Moreover, in a particular embodiment, as illustrated in FIG. 7, the display 728, the input device 730, the speaker 736, the microphone 738, the wireless antenna 742, and the power supply 744 are external to the on-chip system 722. However, each is coupled to a component of the on-chip system 722. The PMIC 757 may be coupled to the power supply 744 to receive an unregulated power supply, which the PMIC 757 may utilize to generate the regulated power supply and to selectively activate power to one or more power domains of an integrated circuit device, which may include one or more elements (such as the processing unit 710, the wireless controller 740, the memory 732, the display controller 726 and the CODEC 734).

In a particular embodiment, the processing unit 710 may process instructions associated with programs necessary to perform the functionality and operations needed by the various components of the portable communication device 700. For example, when a wireless communication session is established via the wireless antenna a user can speak into the microphone 738. Electronic signals representing the user's voice can be sent to the CODEC 734 to be encoded. The processing unit 710 can perform data processing for the CODEC 734 to encode the electronic signals from the microphone. Further, incoming signals received via the wireless antenna 742 can be sent to the CODEC 734 by the wireless controller 740 to be decoded and sent to the speaker 736. The processing unit 710 can also perform the data processing for the CODEC 734 when decoding the signal received via the wireless antenna 742.

Further, before, during, or after the wireless communication session, the processing unit 710 can process inputs that are received from the input device 730. For example, during the wireless communication session, a user may be using the input device 730 and the display 728 to surf the Internet via a web browser that is embedded within the memory 732 of the portable communication device 700.

Figure 8:
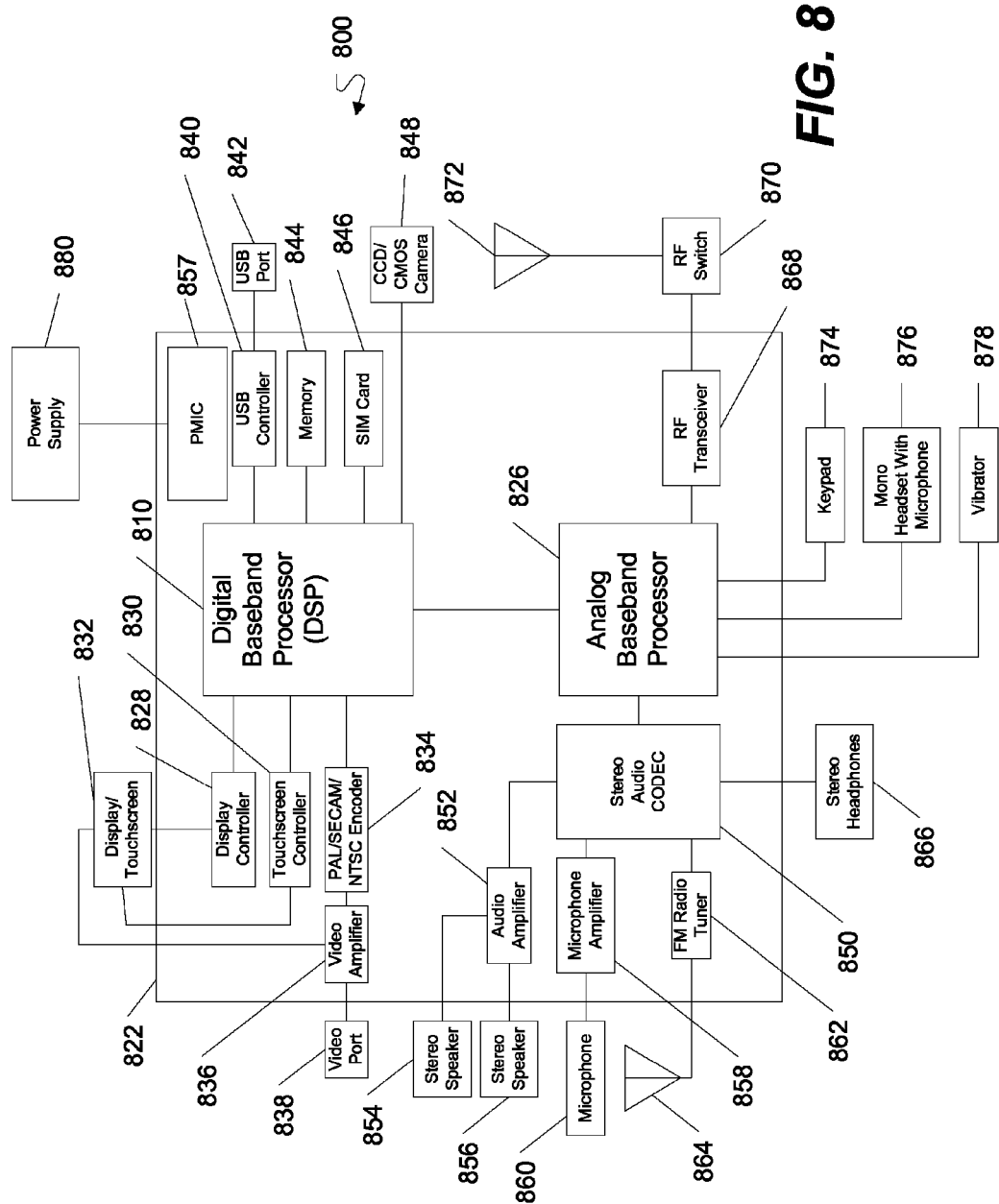
FIG. 8 is a general diagram of an exemplary wireless Internet Protocol telephone incorporating a processor and a memory in which the system and method of FIGS. 1-6 may be used.

Referring to FIG. 8, an exemplary, non-limiting embodiment of a wireless telephone is shown and is generally designated 800. As shown, the wireless telephone 800 includes an on-chip system 822 that includes a digital baseband processor 810 and an analog baseband processor 826 that are coupled together. The wireless telephone 800 may alternatively include a general-purpose processor that is adapted to execute processor readable instructions to perform digital or analog signal processing, as well as other operations. In a particular embodiment, a general-purpose processor (not shown) may be included in addition to the digital baseband processor 810 and the analog baseband processor 826 to execute processor readable instructions. As illustrated in FIG. 8, a display controller 828 and a touchscreen controller 830 are coupled to the digital baseband processor 810. In turn, a touchscreen display 832 external to the on-chip system 822 is coupled to the display controller 828 and to the touchscreen controller 830. In a particular embodiment, the digital baseband processor 810, the analog baseband processor 826, the display controller 828, the touchscreen controller 830, other components, or any combination thereof may receive power from a power manager integrated circuit (PMIC) 857, such as the PMIC devices shown in FIGS. 1-6 and described herein.

FIG. 8 further indicates that a video encoder 834, e.g., a phase alternating line (PAL) encoder, a sequential couleur avec memoire (SECAM) encoder, or a national television system(s) committee (NTSC) encoder, is coupled to the digital baseband processor 810. Further, a video amplifier 836 is coupled to the video encoder 834 and to the touchscreen display 832. Also, a video port 838 is coupled to the video amplifier 836. As depicted in FIG. 8, a universal serial bus (USB) controller 840 is coupled to the digital baseband processor 810. Also, a USB port 842 is coupled to the USB controller 840. A memory 844 and a subscriber identity module (SIM) card 846 can also be coupled to the digital baseband processor 810. Further, as shown in FIG. 8, a digital camera 848 can be coupled to the digital baseband processor 810. In an exemplary embodiment, the digital camera 848 is a charge-coupled device (CCD) camera or a complementary metal-oxide semiconductor (CMOS) camera.

As further illustrated in FIG. 8, a stereo audio CODEC 850 can be coupled to the analog baseband processor 826. Moreover, an audio amplifier 852 can coupled to the to the stereo audio CODEC 880. In an exemplary embodiment, a first stereo speaker 854 and a second stereo speaker 856 are coupled to the audio amplifier 852. FIG. 8 shows that a microphone amplifier 858 can be also coupled to the stereo audio CODEC 850. Additionally, a microphone 860 can be coupled to the microphone amplifier 858. In a particular embodiment, a frequency modulation (FM) radio tuner 862 can be coupled to the stereo audio CODEC 850. Also, an FM antenna 864 is coupled to the FM radio tuner 862. Further, stereo headphones 866 can be coupled to the stereo audio CODEC 850.

FIG. 8 further indicates that a radio frequency (RF) transceiver 868 can be coupled to the analog baseband processor 826. An RF switch 870 can be coupled to the RF transceiver 868 and to an RF antenna 872. As shown in FIG. 8, a keypad 874 can be coupled to the analog baseband processor 826. Also, a mono headset with a microphone 876 can be coupled to the analog baseband processor 826. Further, a vibrator device 878 can be coupled to the analog baseband processor 826. FIG. 8 also shows that a power supply 880 can be coupled to the on-chip system 822. In a particular embodiment, the power supply 880 is a direct current (DC) power supply that provides power to the various components of the wireless telephone 800 that require power. Further, in a particular embodiment, the power supply is a rechargeable DC battery or a DC power supply that is derived from an alternating current (AC) to DC transformer that is connected to an AC power source. The PMIC 857 may be coupled to the power supply 880 to receive an unregulated power supply, which the PMIC 857 may utilize to generate a regulated power supply. The PMIC 857 may provide the regulated power supply to one or more power domains of an integrated circuit device, which may include one or more elements (such as the display controller 828, the digital signal processor 810, the USB controller 840, the touchscreen controller 830, the video amplifier 836, the PAL/SECAM/NTSC encoder 834, the memory 844, the SIM card 846, the audio amplifier 852, the microphone amplifier 858, the FM radio tuner 862, the stereo audio CODEC 850, the analog baseband processor 826, and the RF transceiver 868). A power domain of the integrated circuit device may include one or more of the elements. The power control unit 857 may selectively activate power to one or more of the power domains, as described above with respect to FIGS. 1-6.

In a particular embodiment, as depicted in FIG. 8, the touchscreen display 832, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator 878, and the power supply 880 are external to the on-chip system 822.

Figure 9:
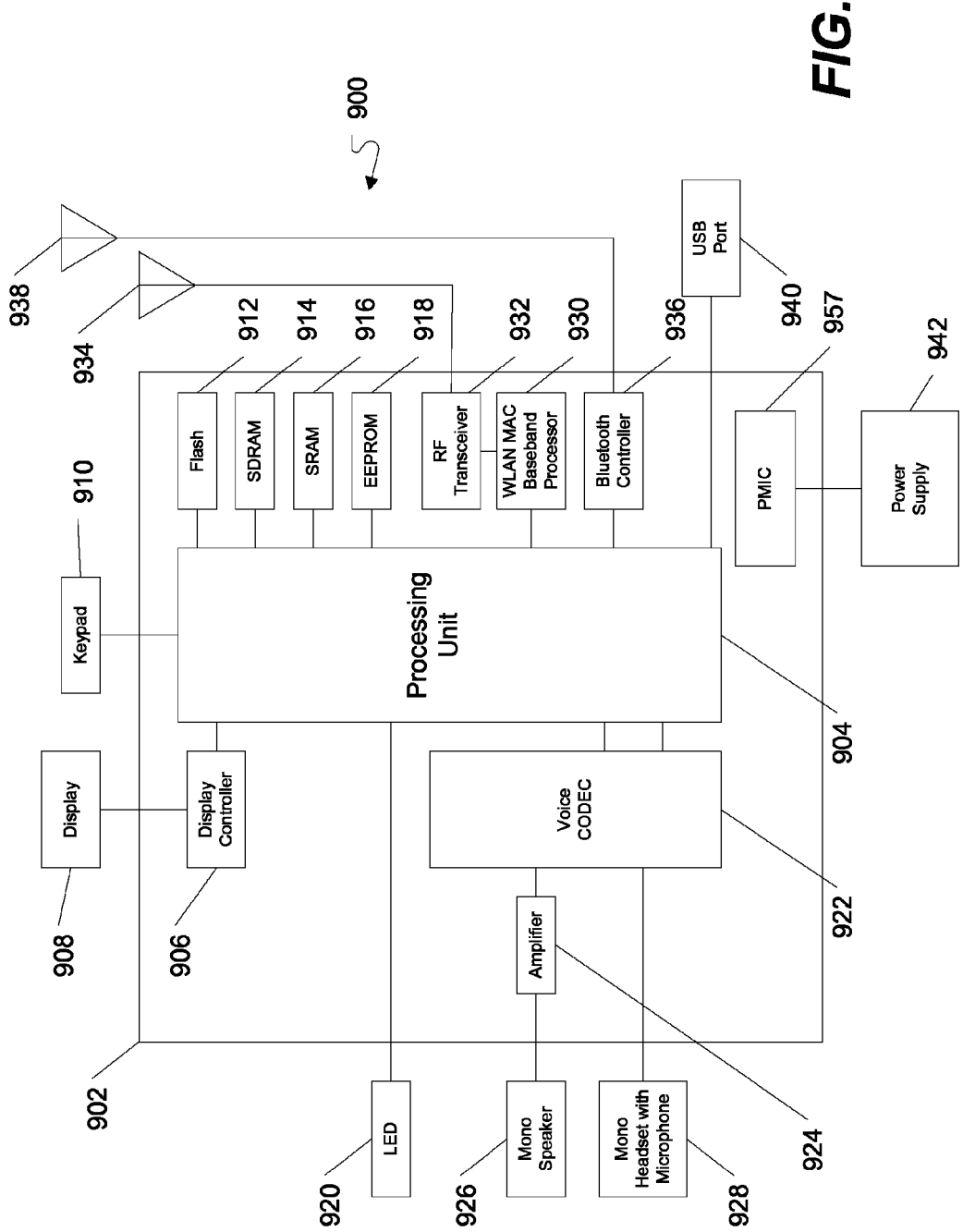
FIG. 9 is a general diagram of an exemplary portable digital assistant incorporating a processor and a memory in which the system and method of FIGS. 1-6 may be used.

Referring to FIG. 9, an exemplary, non-limiting embodiment of a wireless Internet protocol (IP) telephone is shown and is generally designated 900. As shown, the wireless IP telephone 900 includes an on-chip system 902 that includes a processing unit 904. The processing unit 904 may be a digital signal processor, a general purpose processor, an advanced reduced instruction set computing machine processor, an analog signal processor, a processor to execute processor readable instruction sets, or any combination thereof. As illustrated in FIG. 9, a display controller 906 is coupled to the processing unit 904 and a display 908 is coupled to the display controller 906. In a particular embodiment, the display 908 is a liquid crystal display (LCD). A keypad 910 can be coupled to the processing unit 904. In a particular embodiment, the processing unit 904, the display controller 906, other components, or any combination thereof may receive power via a power manager integrated circuit (PMIC) 957, such as that shown in FIGS. 1-6 and described herein.

As further depicted in FIG. 9, a flash memory 912 can be coupled to the processing unit 904. A synchronous dynamic random access memory (SDRAM) 914, a static random access memory (SRAM) 916, and an electrically erasable programmable read only memory (EEPROM) 918 can also be coupled to the processing unit 904. FIG. 9 also shows that a light emitting diode (LED) 920 can be coupled to the processing unit 904. Additionally, in a particular embodiment, a voice CODEC 922 can be coupled to the processing unit 904. An amplifier 924 can be coupled to the voice CODEC 922 and a mono speaker 926 can be coupled to the amplifier 924. FIG. 9 further indicates that a mono headset 928 can also be coupled to the voice CODEC 922. In a particular embodiment, the mono headset 928 includes a microphone.

FIG. 9 also illustrates that a wireless local area network (WLAN) baseband processor 930 can be coupled to the processing unit 904. An RF transceiver 932 can be coupled to the WLAN baseband processor 930 and an RF antenna 934 can be coupled to the RF transceiver 932. In a particular embodiment, a Bluetooth controller 936 can also be coupled to the processing unit 904 and a Bluetooth antenna 938 can be coupled to the controller 936. A USB port 940 may be coupled to the processing unit 904. Moreover, a power supply 942 is coupled to the on-chip system 902 and provides power to the various components of the wireless IP telephone 900 via the PMIC 957.

In a particular embodiment, as indicated in FIG. 9, the display 908, the keypad 910, the LED 920, the mono speaker 926, the mono headset 928, the RF antenna 934, the Bluetooth antenna 938, the USB port 940, and the power supply 942 are external to the on-chip system 902. However, each of these components is coupled to one or more components of the on-chip system 902. The wireless VoIP device 900 includes the PMIC 957, which may be coupled to the power supply 942 to receive an unregulated power supply, which the PMIC 957 may utilize to generate the regulated power supply. If the on-chip system 902 includes a plurality of power domains, the PMIC 957 may selectively provide the regulated power supply to one or more of the plurality of power domains of the on-chip system. A power domain of the on-chip system 902 may include one or more elements, such as the display controller 906, the amplifier 924, the voice CODEC 922, the processing unit 904, the flash memory 912, the SDRAM 914, the SRAM 916, the EEPROM 918, the RF transceiver 932, WLAN MAC baseband processor 930, and the Bluetooth controller 936. The power control unit 957 may selectively activate power to one or more of the power domains, as described above with respect to FIGS. 1-6.

Figure 10:
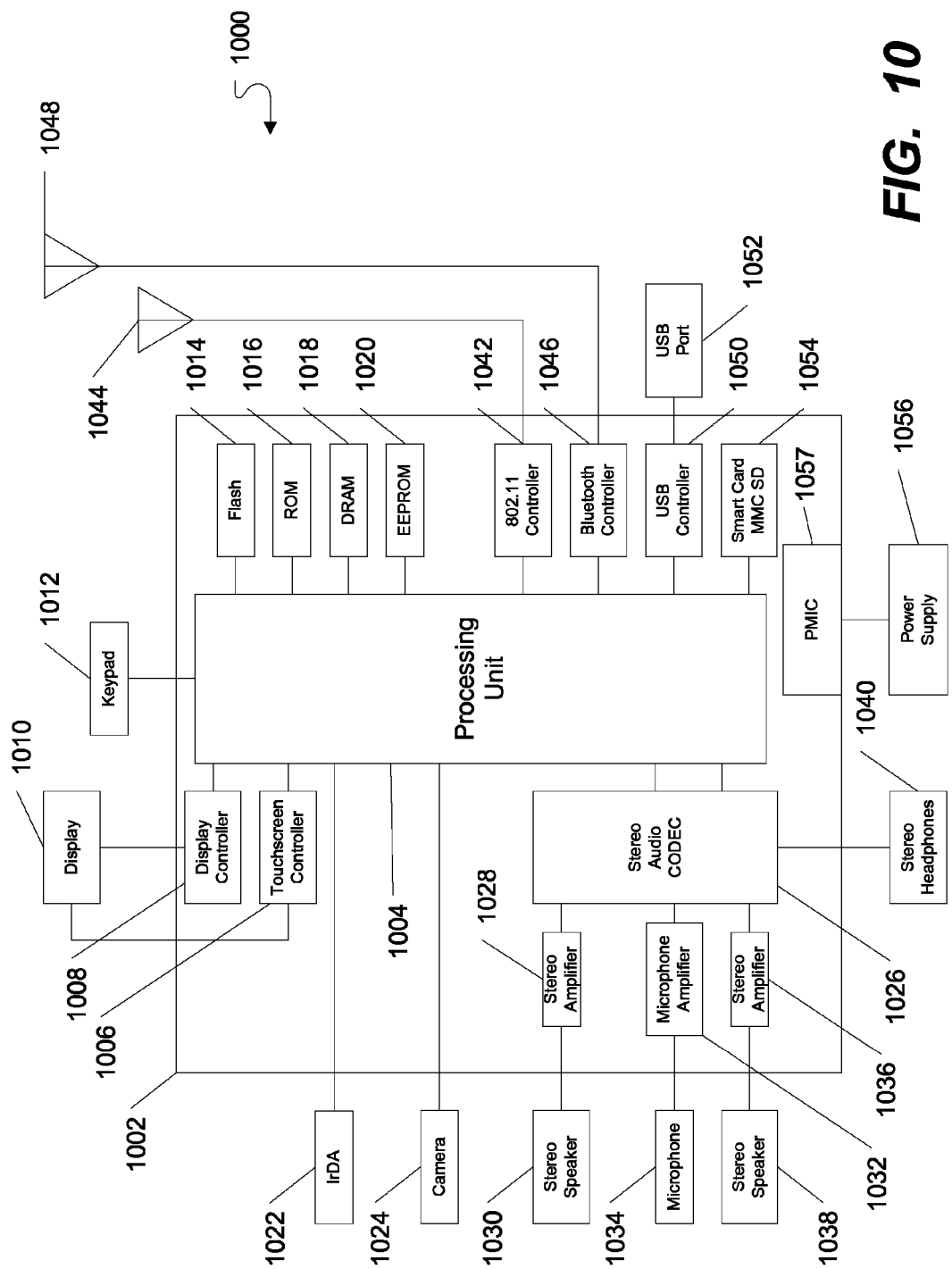
FIG. 10 is a general diagram of an exemplary audio file player incorporating a processor and a memory in which the system and method of FIGS. 1-6 may be used.

FIG. 10 illustrates an exemplary, non-limiting embodiment of a portable digital assistant (PDA) that is generally designated 1000. As shown, the PDA 1000 includes an on-chip system 1002 that includes a processing unit 1004. As depicted in FIG. 10, a touchscreen controller 1006 and a display controller 1008 are coupled to the processing unit 1004. Further, a touchscreen display 1010 is coupled to the touchscreen controller 1006 and to the display controller 1008. FIG. 10 also indicates that a keypad 1012 can be coupled to the processing unit 1004. In a particular embodiment, the processing unit 1004, the touchscreen controller 1006, the display controller 1008, other components, or any combination thereof may receive power via a power manager integrated circuit (PMIC) 1057, as shown in FIGS. 1-6 and described herein.

As further depicted in FIG. 10, a flash memory 1014 can be coupled to the processing unit 1004. The processing unit 1004 may be a digital signal processor (DSP), a general purpose processor, an advanced reduced instruction set computing machine, an analog signal processor, a processor adapted to execute processor readable instruction sets, or any combination thereof. Also, a read only memory (ROM) 1016, a dynamic random access memory (DRAM) 1018, and an electrically erasable programmable read only memory (EEPROM) 1020 can be coupled to the processing unit 1004. FIG. 10 also shows that an infrared data association (IrDA) port 1022 can be coupled to the processing unit 1004. Additionally, in a particular embodiment, a digital camera 1024 can be coupled to the processing unit 1004.

As shown in FIG. 10, in a particular embodiment, a stereo audio CODEC 1026 can be coupled to the processing unit 1004. A first stereo amplifier 1028 can be coupled to the stereo audio CODEC 1026 and a first stereo speaker 1030 can be coupled to the first stereo amplifier 1028. Additionally, a microphone amplifier 1032 can be coupled to the stereo audio CODEC 1026 and a microphone 1034 can be coupled to the microphone amplifier 1032. FIG. 10 further shows that a second stereo amplifier 1036 can be coupled to the stereo audio CODEC 1026 and to a second stereo speaker 1038. In a particular embodiment, stereo headphones 1040 can also be coupled to the stereo audio CODEC 1026.

FIG. 10 also illustrates that an 802.11 controller 1042 can be coupled to the processing unit 1004 and an 802.11 antenna 1044 can be coupled to the 802.11 controller 1042. Moreover, a Bluetooth controller 1046 can be coupled to the processing unit 1004 and a Bluetooth antenna 1048 can be coupled to the Bluetooth controller 1046. As depicted in FIG. 10, a USB controller 1050 can be coupled to the processing unit 1004 and a USB port 1052 can be coupled to the USB controller 1050. Additionally, a smart card 1054, e.g., a multimedia card (MMC) or a secure digital card (SD) can be coupled to the processing unit 1004. Further, as shown in FIG. 10, a power supply 1056 may be coupled to the PMIC 1057 of the on-chip system 1002 to provide power to the various components of the PDA 1000.

In a particular embodiment, as indicated in FIG. 10, the display 1010, the keypad 1012, the IrDA port 1022, the digital camera 1024, the first stereo speaker 1030, the microphone 1034, the second stereo speaker 1038, the stereo headphones 1040, the 802.11 antenna 1044, the Bluetooth antenna 1048, the USB port 1052, and the power supply 1056 are external to the on-chip system 1002. However, each of these components is coupled to one or more components on the on-chip system 1002. The PMIC 1057 may be coupled to the power supply 1056 to receive an unregulated power supply, which the PMIC 1057 may utilize to generate the regulated power supply. The PMIC 1057 may provide power to one or more power domains of the on-chip system 1002, which may include one or more elements (such as the display controller 1008, the touchscreen controller 1006, the stereo amplifier 1028, the microphone amplifier 1032, the stereo amplifier 1036, the processing unit 1004, the stereo audio CODEC 1026, the flash memory 1014, the ROM 1016, the DRAM 1018, the EEPROM 1020, the 802.11 controller 1042, the Bluetooth controller 1046, the USB controller 1050, and the smart card MMC SD 1054). A power domain of the on-chip system 1002 may include one or more of these elements, and the power control unit 1057 may selectively activate power to one or more of the power domains, as described above with respect to FIGS. 1-6.

The various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to such disclosed embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A device comprising:
   a first pin to supply power to a first power domain of an integrated circuit;
   a second pin to supply power to a second power domain of the integrated circuit;
   a switching regulator coupled to the first pin to provide a first regulated power supply to the first power domain and coupled to the second pin to provide a second regulated power supply to the second power domain; and
   a controller coupled to the first pin and to the second pin to selectively reduce current flow to the second pin but not to the first pin during a low power event, wherein the controller comprises:
   logic to determine an operating mode; and
   a low drop out regulator including an input coupled to the first pin and an output coupled to the second pin, the low drop out regulator responsive to the logic to selectively reduce the current flow to the second pin.

2. The circuit device of claim 1, wherein the low power event is selected from a group consisting of a shut down event, an idle event, and a reduced power event.

3. The circuit device of claim 1, wherein the controller limits the current flow to a current level less than approximately 100 nanoamperes during the low power event.

4. The circuit device of claim 1, wherein the switching regulator comprises a buck controller and a buck regulator responsive to the buck controller.

5. The circuit device of claim 1, wherein the controller comprises a head controller and a switch responsive to the head controller, the switch to selectively deactivate the second regulated power supply with respect to the second power domain.

6. The circuit device of claim 5, wherein a voltage drop across the switch is less than or equal to 5 mV when the current flow to the integrated circuit is approximately 100 mA.

7. The circuit device of claim 1, wherein the controller is adapted to selectively disable current flow to a plurality of collapsible power domains.

8. The circuit device of claim 1, wherein the switching regulator is fabricated using a 180 nm fabrication technology, and wherein the integrated circuit is fabricated using a 45 nm fabrication technology.

9. The circuit device of claim 1, further comprising a transistor including a first terminal coupled to the first pin; a control terminal coupled to the controller, and a second terminal coupled to the second pin, the controller to selectively deactivate the transistor to substantially reduce the current flow to the second pin during the low power event.

10. A power manager integrated circuit comprising:
  a buck controller to produce a first regulated power supply;
  a first pin coupled to a first power domain of an integrated circuit and responsive to the buck controller to provide the first regulated power supply to the first power domain;
  a second pin coupled to a second power domain of the integrated circuit to provide a second regulated power supply derived from the first regulated power supply to the second power domain; and
  a head controller to determine an operating mode and to selectively reduce or disable current flow to the second pin but not to the first pin when the operating mode comprises a low power mode, wherein the head controller comprises:
    logic to determine the operating mode and to provide at least one control signal; and
    a low drop out regulator including an input coupled to the first pin and an output coupled to the second pin, the low drop out regulator responsive to the logic to selectively reduce current flow to the second pin.

11. The power manager integrated circuit of claim 10, further comprising:
  a third pin coupled to an external inductor;
  a first transistor including a first transistor first terminal coupled to a first voltage supply terminal, a first transistor control terminal coupled to the buck controller, and a first transistor second terminal coupled to the third pin;
  a second transistor including a second transistor first terminal coupled to the third pin, a second transistor control terminal coupled to the buck controller, and a second transistor second terminal coupled to a second voltage supply terminal;
  wherein the first transistor and the second transistor are responsive to the buck controller to provide a power supply to the inductor via the third pin.

12. The power manager integrated circuit of claim 10, further comprising:
  a third transistor including a third transistor first terminal coupled to the first pin, a third transistor control terminal coupled to the head controller, and a third transistor second terminal coupled to the second pin, the third transistor responsive to the head controller to selectively reduce current flow to the second pin in the low power mode.

13. The power manager integrated circuit of claim 12, further comprising: a fourth transistor including a fourth transistor first terminal coupled to the first pin, a fourth transistor control terminal coupled to the control terminal of the third transistor, and a fourth transistor second terminal coupled to the second pin, the fourth transistor responsive to the head controller to selectively reduce current flow to the second pin.

14. The power manager integrated circuit of claim 10, wherein the head controller reduces current flow to the second pin to a current level that is less than approximately 100 nanoamperes.

15. The power manager integrated circuit of claim 10, wherein the buck controller provides the first regulated power supply to the first domain via the first pin and selectively provides the second regulated power supply to the second domain via the second pin.

16. The power manager integrated circuit of claim 10, wherein the integrated circuit includes a plurality of power domains and wherein the buck controller is adapted to provide the first regulated power supply to the first power domain via the first pin and the head controller is adapted to provide the second regulated power supply to the second power domain and at least one additional regulated power supply to one or more other power domains of the plurality of power domains.

17. The power manager integrated circuit of claim 10, wherein the head controller is adapted to scale at least one of a current level or a voltage level to the second pin to control the second regulated power supply to the second power domain.

18. A method comprising:
  supplying a first regulated supply voltage to a first pin of a power manager integrated circuit and a second regulated supply voltage to a second pin of the power manager integrated circuit; and
  during a low power event, selectively reducing current flow to the second pin but not to the first pin via a low drop out regulator having an input coupled to the first pin and an output coupled to the second pin, according to an operating mode determined by logic.

19. The method of claim 18, wherein selectively reducing current flow comprises:
  deactivating a transistor coupled to the first pin and to the second pin to substantially reduce current flow to the second pin in a low power mode.

20. The method of claim 19, further comprising:
  providing a supply voltage to the first pin during the low power mode to retain a state of the integrated circuit device.

21. The method of claim 18, wherein the first regulated power supply is at a different power level than the second regulated power supply.

22. The method of claim 18, wherein selectively reducing current flow comprises reducing current flow to the second pin to a current level that is less than approximately 100 nanoamperes.

23. The method of claim 18, further comprising scaling a voltage level to the second power domain to adjust a power level of the second power domain over a period of time.

24. A system comprising:
  means for supplying a first regulated supply voltage to a first pin of an integrated circuit device and a second regulated supply voltage to a second power domain of an integrated circuit using a second pin of the integrated circuit device; and
  means for selectively reducing current flow to the second pin but not to the first pin according to an operating mode, wherein the means for selectively reducing current flow includes:
    logic to determine the operating mode; and
    a low drop out regulator including an input coupled to the first pin and an output coupled to the second pin, the low drop out regulator responsive to the logic to selectively reduce the current flow to the second pin during a low power event.

25. The system of claim 24, wherein the means for supplying comprises a buck regulator.

26. The system of claim 24, wherein the means for selectively reducing current flow comprises a head controller.

27. A mobile communications device comprising:
  an integrated circuit device including a plurality of power domains; and
  a power manager integrated circuit responsive to a power supply and coupled to the integrated circuit device, the power manager integrated circuit comprising:
    a first pin to supply power to a first power domain of the plurality of power domains;
    a second pin to supply power to a second power domain of the plurality of power domains;
    a switching regulator coupled to the first pin to provide a first regulated power supply to the first power domain and coupled to the second pin to provide a second regulated power supply to the second power domain; and a controller coupled to the first pin and to the second pin to selectively reduce current flow to the second pin but not to the first pin during a low power event, wherein the controller comprises:

logic to determine the operating mode; and a low drop out regulator including an input coupled to the first pin and an output coupled to the second pin, the low drop out regulator responsive to the logic to selectively reduce current flow to the second pin.

28. The mobile communications device of claim 27, wherein the low power event comprises a power saving mode of operation.

29. The mobile communications device of claim 27, wherein the controller reduces current flow to a current level that is less than approximately 100 nanoamperes.

30. The device of claim 1, wherein the device is arranged in a foot-switch configuration.

31. A power manager integrated circuit comprising:

a buck controller to produce a first regulated power supply;

a first pin coupled to a first power domain of an integrated circuit and responsive to the buck controller to provide the first regulated power supply to the first power domain;

a second pin coupled to a second power domain of the integrated circuit to provide a second regulated power supply derived from the first regulated power supply to the second power domain;

a head controller to determine an operating mode and to selectively reduce or disable current flow to the second pin but not to the first pin when the operating mode comprises a low power mode;

a third pin coupled to an external inductor;

a first transistor including a first transistor first terminal coupled to a first voltage supply terminal, a first transistor control terminal coupled to the buck controller, and a first transistor second terminal coupled to the third pin; and a second transistor including a second transistor first terminal coupled to the third pin, a second transistor control terminal coupled to the buck controller, and a second transistor second terminal coupled to a second voltage supply terminal;

wherein the first transistor and the second transistor are responsive to the buck controller to provide a power supply to the external inductor via the third pin.

32. The power manager integrated circuit of claim 31, further comprising:

a third transistor including a third transistor first terminal coupled to the first pin, a third transistor control terminal coupled to the head controller, and a third transistor second terminal coupled to the second pin, the third transistor responsive to the head controller to selectively reduce current flow to the second pin in the low power mode.

33. The power manager integrated circuit of claim 32, further comprising:

a fourth transistor including a fourth transistor first terminal coupled to the first pin, a fourth transistor control terminal coupled to the control terminal of the third transistor, and a fourth transistor second terminal coupled to the second pin, the fourth transistor responsive to the head controller to selectively reduce current flow to the second pin.

34. The power manager integrated circuit of claim 31, wherein the head controller reduces current flow to the second pin to a current level that is less than approximately 100 nanoamperes.

35. The power manager integrated circuit of claim 31, wherein the buck controller provides a first regulated power supply to the first domain via the first pin and selectively provides a second regulated power supply to the second domain via the second pin.

36. The power manager integrated circuit of claim 31, wherein the integrated circuit includes a plurality of power domains and wherein the buck controller is adapted to provide the first regulated power supply to the first power domain via the first pin and the head controller is adapted to provide the second regulated power supply to the second power domain and to provide at least one additional regulated power supply to one or more other power domains of the plurality of power domains.

37. The power manager integrated circuit of claim 31, wherein the head controller is adapted to scale at least one of a current level or a voltage level to the second pin to control the second regulated power supply to the second power domain.

38. A device comprising:

a controller coupled to a first pin to supply power to a first power domain of an integrated circuit and coupled to a second pin to supply power to a second power domain of the integrated circuit, wherein the controller comprises:

logic to determine an operating mode; and a low drop out regulator including an input coupled to the first pin and an output coupled to the second pin, the low drop out regulator responsive to the logic to selectively reduce current flow to the second pin but not to the first pin during a low power event.

39. The device of claim 38, wherein the controller limits the current flow to the second pin to a current level less than approximately 100 nanoamperes during the low power event.

40. A power manager integrated circuit comprising:

a buck controller to produce a first regulated power supply to a first pin and to produce a second regulated power supply to a second pin; and a head controller comprising:

logic to determine an operating mode; and a low drop out regulator including an input coupled to the first pin and an output coupled to the second pin, the low drop out regulator responsive to the logic to selectively reduce current flow from the buck controller to the second pin during a low power event but not to the first pin during the low power event.

41. The circuit device of claim 40, wherein the head controller limits the current flow from the buck controller to the second pin to a current level less than approximately 100 nanoamperes during the low power event.

42. A system comprising:

means for selectively reducing current flow to a second pin but not to a first pin according to an operating mode, wherein the means for selectively reducing current flow includes:

logic to determine an operating mode; and a low drop out regulator including an input coupled to the first pin and an output coupled to the second pin, the low drop out regulator responsive to the logic to selectively reduce the current flow to the second pin during a low power event.

43. The system of claim 42, further comprising a buck regulator to supply a first regulated power supply to the first pin and to provide the current flow to the second pin, wherein the current flow to the second pin is derived from the first regulated power supply.

* * * * *

UNITED STATES PATENT AND TRADEMARK OFFICE
CERTIFICATE OF CORRECTION

PATENT NO. : 7,812,582 B2  
APPLICATION NO. : 11/532000  
DATED : October 12, 2010  
INVENTOR(S) : Chua-Eoan et al.

Page 1 of 1

It is certified that error appears in the above-identified patent and that said Letters Patent is hereby corrected as shown below:

Title Page, Item [73], After the first assignee add the following:

Industry-Academic Cooperation Foundation, Yonsei University, Seoul, Korea (KR)

To be listed as follows:

[73] Assignees: QUALCOMM Incorporated, San Diego, CA (US)
Industry-Academic Cooperation Foundation, Yonsei University, Seoul, Korea (KR)

On the Title Page:

The first or sole Notice should read --

Subject to any disclaimer, the term of this patent is extended or adjusted under 35 U.S.C. 154(b) by 238 days.

Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,812,582 B2 | Page 1 of 1 |
| APPLICATION NO. | : 11/532000 | |
| DATED | : October 12, 2010 | |
| INVENTOR(S) | : Chua-Eoan et al. | |

It is certified that error appears in the above-identified patent and that said Letters Patent is hereby corrected as shown below:

Column 17, line 8, Claim 27: "the operating mode" to read as --an operating mode--

Signed and Sealed this
Twelfth Day of July, 2011

David J. Kappos
*Director of the United States Patent and Trademark Office*